2,734,014
Patented Feb. 7, 1956

United States Patent Office

2,734,014

GLUCOSIDE COLCHICOSIDE AND A METHOD OF MAKING SAME

Paul Bellet, Paris, and Gaston Amiard, Noisy-le-Sec, France, assignors to UCLAF, a French body corporate No Drawing. Application January 19, 1953,
Serial No. 332,115

Claims priority, application France January 22, 1952

20 Claims. (Cl. 167—65)

This invention relates to a new colchicum glucoside, and more particularly to the new colchicum glucoside colchicoside, and to a method of making same.

It is one object of this invention to provide a new physiologically active glucoside derived from plants of the genus Colchicum.

Another object of this invention is to provide a simple and effective method of preparing said new glucoside and of separating it from other active compounds derived from plants of the genus Colchicum.

It is a further object of this invention to provide a synthetic method of producing the new colchicum glucoside colchicoside.

Still another object of this invention consists in providing new acyl derivatives of said glucoside colchicoside, and more particularly a new acetyl derivative thereof.

A further object of this invention is to provide a simple and effective method of synthetically preparing such new glucoside and its acyl derivatives.

Another object of this invention is to provide new preparations containing said new glucoside colchicoside and/or its acyl derivatives, said preparations being useful as antimitotic preparations useful, for instance, in agriculture for causing polyploidism.

Other objects of this invention, together with some of the advantageous features thereof, will appear from the following description of a preferred mode as well as certain modified modes of practicing the process according to this invention and from the examples given hereinafter.

The new compound obtained according to the present invention from plants of the genus Colchicum was found to be a glucoside. It will be designated herein and in the claims annexed hereto as "colchicoside" in accordance with accepted nomenclature. The new compound is entirely different from any of the other physiologically active compounds obtained from such plants of the genus Colchicum, such as the alkaloid colchicine known for a long time, and the substances B, C, D, E₁, E₂, F, G, I and J which were recently described by F. Santavy et al. in "Pharm. Acta Helv.," vol. 25, page 248 (1950); F. Santavy and T. Reichstein "Helv. Chim. Acta," vol. 33, page 1606 (1950); F. Santavy et al. "Ann. Pharm. Franc.," vol. 9, page 50 (1951). Colchicine and the compounds B, C, D, E₁, E₂, F, G, I, and J will be called hereinafter and in the claims annexed hereto "the active colchicum principles."

The new compound differs essentially from the other above mentioned colchicum compounds by its glucosidic nature and by other characteristic physical as well as chemical properties, especially by its insolubility in ethyl acetate and chlorinated solvents, such as chloroform, trichloro ethylene and the like wherein said other colchicum compounds are soluble. Said difference in solubility of colchicoside permits and facilitates its separation from said other accompanying colchicum compounds.

The new glucoside colchicoside, according to the present invention, is a well crystallizing substance. It is soluble in water, lower aliphatic alcohols, such as methanol, ethanol, n-propanol, and isopropanol, and also in pyridine and related bases. It is very readily soluble in solvent mixtures and more particularly in mixtures of the above mentioned lower aliphatic alcohols and halogenated solvents, such as halogenated lower aliphatic hydrocarbons, for instance, chloroform tetrachloro ethane, trichloro ethylene. It is, however, practically insoluble in such halogenated solvents alone. Colchicoside crystallizes from ethanol in tablets or rectangular prisms which do not contain any solvent of crystallization. It melts at about 216–218° C. after sintering at about 190° C. It is strongly levorotatory in 1% aqueous solution: $|\alpha|_D^{15}:-360°\pm3°$; $|\alpha|_J^{15}:-375°\pm3°$; $|\alpha|_V^{15}:-455°\pm4°$. Analytical data and a study of its degradation products indicate that a formula $C_{27}H_{33}O_{11}N$, corresponding to a molecular weight of 547.5, must be attributed to this glucoside. On exposure to ultra-violet rays, colchicoside exhibits a bluish-white fluorescence. Its absorption spectrum is similar to that characteristic for a benzeno-cyclo-heptano-tropolonic structure. Under the influence of mineral acids it acquires an intense yellow color. After boiling in acid medium, it yields with ferrichloride a green coloration (Zeisel's reaction) and reduces alkaline cupric tartrate test solution of Fehling.

The glucosidic nature of colchicoside is proven by a study of its products of hydrolysis. The amount of glucose split off on hydrolysis shows that glucose is present in the ratio of one mol of glucose per mol of colchicoside.

The new glucoside is not precipitated from its aqueous solution by the addition of neutral or basic lead acetate, nor by the addition of generally known alkaloid reagents. In contrast hereto, bromine water produces after several hours an abundant white, amorphous precipitate.

Colchicoside, on injection of its aqueous solution into the mouse, exhibits a low toxicity, said glucoside being at least ten times less toxic than colchicine. Otherwise, it has about the same physiological properties. Colchicoside, on account of its low toxicity, can be handled much more readily and safely than colchicine in all its applications in biology, medicine, agriculture and industry.

Its ability of causing polyploidism allows application of colchicosde for creating various types of improved vegetables and other agricultural plants. It was found that the soil on which such plants are cultivated can be successfully treated with aqueous solutions of colchicoside. One may, of course, subject the seeds themselves to a treatment with such aqueous solutions.

In principle, the process according to this invention consists in first extracting all the active principles from plant material of the genus Colchicum by means of a solvent wherein all of said active principles are soluble with the exception of colchicoside, said solvent being called hereinafter and in the claims annexed hereto "the first extraction solvent" and then treating the residue with a second solvent which dissolves colchicoside and recovering said colchicoside from the resulting solution in said "second extraction solvent."

Parts of plants of the genus Colchicum, especially the seeds and bulbo-tubers of *Colchicum autumnale*, are used as starting material. They are dried and ground and are either directly worked up according to the present invention or, preferably, after defattening by extraction with a hydrocarbon or an ether.

Extraction of such preferably defattened plant material by means of solvents wherein colchicoside is substantially insoluble is carried out at room temperature or at elevated temperature according to the various extraction methods used in chemistry, such as infusion, decoction, percolation, maceration, digestion or the like. It is, of course, very convenient and, therefore, more preferred to carry out such extraction at room temperature.

The first extraction solvent used for dissolving the active principles of colchicum with the exception of colchicoside consists of a halogenated lower aliphatic hydrocarbon, such as chloroform, tetrachloro ethane, trichloro ethylene.

The second solvent which is used for extracting colchicoside from the resulting extraction residue may be one of the above mentioned solvents for colchicoside, such as water, a lower aliphatic alcohol, or a mixture of said solvents, or, preferably, a mixture of a lower aliphatic alcohol with a lower halogenated aliphatic hydrocarbon, such as a mixture of ethanol and chloroform.

Colchicoside is recovered from the solution obtained thereby by evaporating the solvent or by allowing the glucoside to crystallize from such solution. It is obtained in a very pure state by repeated recrystallization from the above mentioned solvents.

According to a modified process of producing colchicoside from plant material of the genus Colchicum, said plant material is first extracted by means of a solvent which is capable of dissolving not only colchicine and the other active colchicum principles, such as compounds B, C, D, $E_1$, $E_2$, F, G, I, and J, but also colchicoside. Such solvents are water, the lower aliphatic alcohols, their mixtures with water, and their mixtures with halogenated lower aliphatic hydrocarbons as they are mentioned above as second extraction solvents.

Such liquid extracts can be handled and manipulated with much better than dried and pulverized plant material. They may be directly subjected to a treatment with the above mentioned first solvents which do not dissolve colchicoside but merely colchicine and the accompanying active compounds. Thereby said other active colchicum principles are eliminated from the extract which contains then only colchicoside. Colchicoside is recovered from the resulting solution, for instance, by extraction by means of the second extraction solvents.

One may, of course, evaporate to dryness a colchicum extract containing colchicoside, colchicine, and the other active colchicum compounds. Said evaporation residue, which represents a hygroscopic resinous material, is then either subjected to the action of a solvent which is capable of dissolving colchicine and the other accompanying active colchicum principles but which does not dissolve colchicoside. Or it is preferably first mixed with a pulverulent inert material, such as aluminum oxide, infusorial earth, clay, calcium sulfate, calcium carbonate, pulverulent carbon, and others. Thereby, a non-hygroscopic powder is obtained which can be readily extracted and further worked up.

An improved mode of carrying out the process according to this invention consists in adding to an aqueous or aqueous-alcoholic colchicum extract a mineral salt which is soluble in water and/or in aqueous-alcoholic solutions, such as ammonium sulfate or magnesium sulfate or ammonium chloride. Said addition reduces the solubility of the active compounds and, thus, favorably effects their removal and the final extraction of colchicoside.

The following examples serve to illustrate the invention. It is to be understood, of course, that the invention is not limited to the precise mode of manufacture hereinafter described nor to the precise order of steps of the processes set forth, as this invention, as defined in the appended claims, can be embodied in a plurality and variety of forms and can be practiced in a plurality and variety of ways.

The following Example 1 describes the treatment of plant material derived from plants of the genus Colchicum without the intermediate preparation of a liquid extract containing all the active principles of said plant material.

*Example 1*

10 kg. of pulverized dried seeds and bulbo-tubers of the autumn crocus Colchicum autumnale are successively extracted first with 40 liters of petrol ether to dissolve the fatty material and then with 40 liters of chloroform which dissolves and removes colchicine and the accompanying active colchicum principles with the exception of colchicoside. The remaining plant powder is treated with 40 liters of a mixture of 95% alcohol and chloroform in the proportion of 1 to 3. The extract obtained thereby is stirred three times with 300 cc. of water. The colchicoside passes into aqueous solution and is recovered therefrom in a crude state by evaporation of the water. It is several times recrystallized from absolute alcohol yielding 25 g. of colchicoside of the above mentioned properties and characteristics.

The following examples describe various ways and methods of preparing first liquid extracts containing all the active principles of the Colchicum plant, including colchicoside, and of subsequently working up said liquid extracts to recover colchicoside therefrom.

*Example 2*

An extract of 10 kg. of colchicum seeds with 90% alcohol is concentrated by evaporation to about 4 liters. The lipoids and resinous substances are then removed from said concentrated extract in a manner known per se. Colchicine and the other active colchicum principles are removed by thoroughly extracting the resulting concentrate five times with 500 cc. of chloroform each. The remaining alcoholic extract is again concentrated by evaporation to a volume of 2 liters. It is then stirred five times with 1 liter each of a mixture of chloroform and ethanol in the proportion of 4 to 1. The colchicoside passes into said chloroform-ethanol mixture. On evaporating the solvents of the resulting extract, about 20 g. of comparatively pure colchicoside are obtained. The yield varies, of course, with the starting material used and its origin. Colchicum seed, as an average, yields about 0.2% of colchicoside.

In the place of the above mentioned alcoholic extract of colchicum seed there may also be used aqueous extracts or aqueous-alcoholic extracts.

*Example 3*

An aqueous extract of 10 kg. of colchicum seed is evaporated to dryness and is mixed and intimately ground with 15 kg. of an inert substance, such as kieselguhr, in order to produce an anhydrous powder. Said powder is thoroughly extracted with 80 liters of trichloro ethylene which dissolves and removes colchicine and the other active colchicum principles, with the exception of colchicoside, and, thereafter, with a mixture of trichloro ethylene and isopropanol in the proportion of 4 to 1. Colchicoside passes into said solvent mixture and is recovered therefrom by evaporation of the solvents. It is purified by repeated fractional crystallization from absolute ethanol.

*Example 4*

20 kg. of pulverized and defattened bulbs and seeds of colchicum are thoroughly extracted by a mixture of ethanol and chloroform in the proportion of 1 to 3. Said extract, on evaporation, yields a residue containing all the characteristic active principles of said plant inclusive colchicoside. The residue is dissolved in 2 liters of water. The solution is four times extracted, while stirring, with 1 liter of chloroform each to remove colchicine and the other active colchicum principles with the exception of colchicoside. The remaining aqueous extract is purified by treatment with activated carbon and is evaporated to dryness. The evaporation residue of said aqueous extract yields, on recrystallization from ethanol, pure colchicoside.

*Example 5*

10 liters of an aqueous-alcoholic extract obtained by extracting 20 kg. of colchicum seed with 80% ethanol, are saturated with ammonium sulfate or with magnesium sulfate or another salt which is readily soluble in aqueous-alcoholic solutions. The salt-saturated solution is stirred five times with 2 liters of tetrachloro ethane each, whereby all the characteristic active colchicum principles, including colchicoside, are extracted. Said extract is stirred three times with 300 cc. of water each. Only colchicoside passes into the aqueous solution which is separated from the tetrachloro ethane solution containing the other active colchicum principles and is purified by means of activated carbon. The purified aqueous extract is evaporated to dryness and the residue is recrystallized from 95% ethanol yielding crystalline colchicoside.

Of course, many variations and changes in the solvents and solvent mixtures used, the inert substances added, the temperature and duration of extraction, the actual manner in which said extraction procedures are effected, the means and ways of purifying and recrystallizing the new colchicoside, and the like, may be made by those skilled in the art in accordance with the principles set forth herein and in the claims annexed hereto.

It may be pointed out that the new glucoside colchicoside can be prepared synthetically.

The synthetic method of producing colchicoside consists in principle in glucosidizing "Substance C," first described by F. Santavy and T. Reichstein in "Helv. Chim. Acta," vol. 33, page 1606 (1950). Said compound which is one of the active principles of plants of the genus Colchicum, is characterized by having a free phenolic group in its molecule. It is condensed with α-acylo bromo glucose to yield the tetraacyl colchicoside according to the following equation:

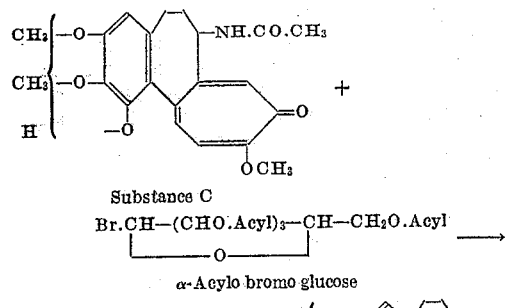

Substance C

Br.CH—(CHO.Acyl)₃—CH—CH₂O.Acyl
|_____O_____|

α-Acylo bromo glucose

Tetraacyl glucosidyl residue (C₁₄H₁₉O₉)

As is evident, the position of the glucoside group in the phenolic nucleus is not yet established with certainty. It is, however, certain that said phenolic nucleus contains two methoxy groups and one glucosido or tetraacyl glucosido group.

The resulting tetraacyl colchicoside is then partly saponified, for instance, by means of alkali in the presence of a solvent, such as ethanol. Colchicoside is obtained by extracting the hydrolysis mixture with a suitable solvent and by recrystallizing the extracted product, for instance, from alcohol.

When using α-aceto bromo glucose as glucosidizing agent, tetraaceto colchicoside of the general formula C₃₅H₄₁O₁₅N is obtained. It crystallizes in rectangular crystals melting at 175–177° C. (in the block), it is levorotatory in 1% solution in chloroform:

$$|\alpha|_D^{15}: -57° \pm 3°$$

α-Acylo chloro glucose, such as α-aceto chloro glucose, may also be used as glucosidizing agent. Condensation of the α-acylo halogeno glucose with substance C is preferably effected in aqueous-acetonic solution in the presence of an alkaline condensing agent.

Saponification of the resulting tetraacyl colchicoside is preferably carried out in absolute alcohol in the presence of sodium hydroxide. One may, of course, use other alkaline agents, such as potassium hydroxide.

The following example serves to illustrate the synthetic method of preparing colchicoside and its tetraacylated derivatives from substance C derived from plants of the genus Colchicum. It is to be understood, of course, that the invention is not to be limited to the precise mode of manufacture hereinafter described but that this method can be practiced in a plurality and variety of ways.

*Example 6*

0.8 g. of crystalline substance C, melting first at 180–190° C. and then at 275–280° C. and having an optical rotation $|\alpha|_D^{15}: -128.5° \pm 2°$ (in chloroform solution), are dissolved in 3 cc. of N sodium hydroxide solution. The solution is cooled to 0° C. 4 cc. of a 25% solution of α-aceto bromo glucose in acetone are added thereto. The mixture is allowed to stand at 15–20° C. for 24 hours and is diluted with 12 cc. of water. 8 cc. of chloroform, to dissolve the acetylated reaction product, and 1 cc. of N sodium hydroxide solution, to neutralize the hydrobromic acid formed and to dissolve any non-reacted substance C, are added to said solution. The mixture is stirred and the chloroform phase is separated. Said chloroform solution is washed with N/2 sodium hydroxide solution to remove any trace of phenolic starting material which might be present in or adhere to the reaction product. The thus treated solution is carefully washed with water to remove any sodium hydroxide present, and the neutral solution is then dried by means of anhydrous sodium sulfate. The solvent is distilled off. The distillation residue represents a clear yellow resin. It is again dissolved in 2 cc. of chloroform. 4 cc. of ether are gradually added to said solution. Thereby 0.46 g. of rectangular crystals of tetraaceto colchicoside are obtained which melt at about 175–177° C. (in the block). Recrystallization does not change said melting point. The reaction product is levorotatory. Its rotatory power is $$|\alpha|_D^{15}: -57° \pm 3°$$

(in 1% solution in chloroform). Analysis of this product indicates a general formula of C₃₅H₄₁O₁₅N and a molecular weight of 715.7. Acetyl value: Calculated: 30.5%; found: 28.9%.

0.3 g. of said tetraaceto colchicoside are dissolved in 3 cc. of absolute alcohol. 4 drops of a 1% alcoholic sodium hydroxide solution are added to said solution. Alcoholysis sets in rapidly and colchicoside crystallizes. The crystals are filtered off and dried at 100° C. Yield: 0.19 g. Said compound, after recrystallization from absolute alcohol, melts at about 216–218° C. (in the block). No decrease in melting point takes place on mixing this compound with colchicoside obtained from Colchicum plant material as described in the preceding examples, thus proving that the two compounds are identical. Optical rotatory power: $|\alpha|_D^{15}: -360° \pm 3°$ (in 1% solution in water). Analysis indicates a general formula of C₂₇H₃₃O₁₁N and a molecular weight of 547.5. N-acetyl value: Calculated: 7.9; found: 7.9.

It is, of course, possible to produce, by simple acylation of colchicoside obtained from Colchicum plant material, for instance, by acetylation by means of acetic acid anhydride, the tetraacyl derivatives, such as the above mentioned tetraacetyl derivative of colchicoside.

When using, in the place of α-aceto bromo glucose, equimolecular amounts of other acylo halogeno glucose compounds, such as α-propionyl bromo glycose, α-benzoyl bromo glucose or the corresponding chloro glucose compounds, the tetrapropionyl or tetra benzoyl colchicoside or the like are obtained which may also be used for the above mentioned purposes.

As stated above the new colchicoside and its tetraacylated derivatives may be administered in therapy, for instance, as specific agents for relieving the pain of acute gout. Colchicine which has been used for this purpose, unfortunately affords relief at just about the same time that severe gastro-intestinal symptoms, such as diarrhea, appear. In contrast hereto, colchicoside and its derivatives are much less toxic and, therefore, relieve the pain before such gastrointestinal disturbances appear.

Tablets containing about 1 mg. to 2 mg. of said compounds are given in an acute gout attack every hour continuously until pain is relieved. Usually 12 to 14 doses are required if therapy has been begun early.

In the place of tablets, one may also administer colchicoside and its derivatives in the form of aqueous, aqueous-alcoholic, or alcoholic solutions, or in the form of powders preferably enclosed in suitable capsules.

Isotonic aqueous solutions thereof may also be administered intravenously whereby a dosage of 1 mg. to 5 mg., repeated at 3 to 6 hour intervals for 3 to 12 doses, depending upon the response, has proven of therapeutic value in a number of cases.

Colchicoside and its tetraacylated derivatives may also be used prophylactically in 0.5 mg. to 2 mg. dosage 3 times daily for 2 to 3 days each week.

To prepare tablets, pills, or the like compressed preparations containing colchicoside or its acylated derivatives according to the present invention for use in human therapy suitable inert vehicles and binding agents are mixed therewith. Such suitable inert pulverulent vehicles are for instance, starches, such as corn starch, potato starch, dextrins, sugars, such as glucose, lactose, and others, proteins, such as casein, soy bean protein and others, or other organic materials, or inorganic materials, such as talc, kieselguhr, kaoline, bentonite, and other silicate minerals or other pulverulent substances.

As binding agents there may be used the customary binding agents employed in making tablets and the like, such as gelatine, methyl cellulose, agar, gum arabic, tragacanth, yeast extracts and many others.

To prepare solutions thereof for oral administration, water and aqueous alcoholic solutions are preferably used, or colchicoside and its derivatives may be incorporated into syrups and the like. For intravenous injection, it is advisable to employ isotonic salt solutions and to adjust the pH of the solution by means of suitable buffer solutions to a pH between about 7.0 and about 7.5.

The following examples serve to illustrate the preparation of such compositions for therapeutical, agricultural, and other use, without, however, limiting the same thereto.

*Example 7*

100 cc. of a 5% aqueous solution of colchicoside are sprayed, while stirring, upon 5,000 g. of sugar. The mixture is then ground and dried in a heated porcelain ball mill, thereby allowing the water vapors to escape through a suitable opening, until a dry, intimately mixed sugar powder containing about 1 mg. of colchicoside per 1 g. of powder is obtained. Said powder is subdivided to the desired dosage units.

*Example 8*

1 g. of tetraaceto colchicoside are intimately mixed with 250 g. of potato starch and 280 g. of lactose. The mixture is granulated by the addition of a small amount of water. The granules are intimately mixed with 50 g. of talcum, 15 g. of stearic acid, and 5 g. of magnesium stearate which serve as lubricants, and are then tableted to tablets weighing about 0.3 g. each and containing about 1 to 2 mg. of tetraaceto colchicoside each.

*Example 9*

A 1% aqueous colchicoside solution is prepared and used in agriculture as concentrate for the preparation of solutions of desired concentration which are used in the treatment of seeds to produce polyploidism.

Of course, many changes and variations in the synthesis of colchicoside and its tetraacylated derivatives from substance C, in the glucosidizing agents, solvents, and condensing agents employed thereby, in the methods of working up and purifying said colchicoside and its tetraacylated derivatives, in the manner in which said compounds are converted into suitable therapeutic preparations and agents used in agriculture and for other purposes, and the like may be made by those skilled in the art in accordance with the principles set forth herein and in the claims annexed hereto.

We claim:

1. In a method of producing colchicoside, the steps comprising condensing colchicum substance C with an α-acylo halogeno glucose to produce tetraacylated colchicoside, and saponifying said tetraacylated colchicoside to form colchicoside.

2. In a method of producing colchicoside according to claim 1, wherein the α-acylo halogeno glucose is α-aceto bromo glucose.

3. In a method of producing colchicoside, the steps comprising dissolving in alkali hydroxide solution colchicum substance C, adding to said solution an acetonic solution of α-aceto bromo glucose, allowing the mixture to stand at room temperature to form tetraaceto colchicoside, adding chloroform to the reaction mixture to dissolve said tetraaceto colchicoside, recovering from said chloroform solution said tetraaceto colchicoside, dissolving said tetraacetyl compound in absolute alcohol in the presence of alkali hydroxide, and separating the saponified crystallized colchicoside.

4. In a method of producing tetraacylated colchicoside, the steps comprising condensing colchicum substance C with an α-acylo halogeno glucose to cause glucosidation of the free phenolic group of said substance C, and separating said tetraacylated colchicoside from the reaction mixture.

5. In a method of producing tetraacylated colchicoside, the steps comprising acylating colchicoside and separating the resulting tetraacylated colchicoside from the acylation mixture.

6. In a method of producing the colchicum glucoside colchicoside, the steps comprising contacting plant material derived from the genus Colchicum with a first extraction solvent to dissolve colchicine and the other active colchicum principles but not colchicoside, separating the resulting solutions from the plant residue, contacting said plant residue with a second extraction solvent to dissolve colchicoside, separating said solution from the contacted plant material, and recovering colchicoside from said solution in the second extraction solvent.

7. In a method of producing the new colchicum glucoside colchicoside according to claim 6, wherein the first extraction solvent is a halogenated lower aliphatic hydrocarbon.

8. In a method of producing the new colchicum glucoside colchicoside according to claim 7, wherein the first extraction solvent is chloroform.

9. In a method of producing the new colchicum glucoside colchicoside according to claim 6, wherein the second extraction solvent is a solvent selected from the group consisting of a lower aliphatic alcohol, a mixture of such lower aliphatic alcohol with water, and a mixture of such lower aliphatic alcohol with a halogenated lower aliphatic hydrocarbon.

10. In a method of producing the new colchicum glucoside colchicoside according to claim 6, wherein the second extraction solvent is a mixture of ethanol and chloroform.

11. In a method of producing the new colchicum glucoside colchicoside according to claim 6, wherein the second extraction solvent is water.

12. In a method of preparing the colchicum glucoside colchicoside, the steps comprising extracting plant material derived from the genus Colchicum with a solvent dissolving all the active colchicum principles including said colchicoside, contacting said extract with a first extraction solvent to dissolve colchicine and the other active colchicum principles but not colchicoside, separating the resulting solution from the extract, contacting said extract with a second extraction solvent to dissolve colchicoside, and recovering colchicoside from said solution in the second extraction solvent.

13. In a method of preparing the colchicum glucoside colchicoside, the steps comprising extracting plant material derived from the genus Colchicum with a solvent dissolving all the active colchicum principles including said colchicoside, contacting said extract with a first extraction solvent to dissolve colchicine and the other active Colchicum principles but not colchicoside, separating the resulting solution from the extract, evaporating said extract to dryness, contacting said dry extract with a second extraction solvent to dissolve colchicoside, and recovering colchicoside from said solution in the second extraction solvent.

14. In a method of preparing the colchicum glucoside colchicoside, the steps comprising extracting plant material derived from the genus Colchicum with a solvent dissolving all the active colchicum principles including said colchicoside, evaporating said extract to dryness, mixing said dried extract with an inert pulverulent substantially non-soluble material to produce a non-hygroscopic anhydrous powder, contacting said extract with a first extraction solvent to dissolve colchicine and the other active Colchicum principles but not colchicoside, separating the resulting solution from the extract, contacting said extract with a second extraction solvent to dissolve colchicoside, and recovering colchicoside from said solution in the second extraction solvent.

15. In a method of preparing the colchicum glucoside colchicoside, the steps comprising extracting plant material derived from the genus Colchicum with a solvent dissolving all the active colchicum principles including said colchicoside, evaporating said extract to dryness, dissolving said evaporation residue in an aqueous solvent selected from the group consisting of water, an aqueous lower aliphatic alcohol, and a mixture of water and a lower aliphatic alcohol, saturating said solution with a salt soluble in water and in such aqueous alcohol, contacting such salt-saturated solution with a first extraction solvent to dissolve colchicine and the other active colchicum principles but not colchicoside, separating the resulting solution from said salt-saturated aqueous solution, contacting said salt-saturated aqueous solution with a second extraction solvent to dissolve colchicoside, and recovering colchicoside from said solution in the second extraction solvent.

16. A new crystalline colchicum glucoside compound selected from the group consisting of colchicoside and its tetraacylated derivatives.

17. The new crystalline colchicum glucoside colchicoside of the general formula $C_{27}H_{33}O_{11}N$, crystallizing in tablets or rectangular prisms, having a melting point of about 216–218° C. and being levorotatory with a rotatory power in 1% aqueous solution of $|\alpha|_D^{15}:-360°\pm3°$; $|\alpha|_J^{15}:-375°\pm3°$; $|\alpha|_V^{15}:-455°\pm4°$, being readily soluble in water, lower aliphatic alcohols, mixtures of said lower aliphatic alcohols with water, and mixtures of said lower aliphatic alcohols with halogenated lower aliphatic hydrocarbons, and pyridine bases, and being substantially insoluble in halogenated lower aliphatic hydrocarbons, its N-acetyl value being about 7.9, said colchicoside containing one glucosidyl residue per mol glucoside, having physiological properties corresponding to those of colchicine and, on injection into the mouse, being at least 10 times less toxic than colchicine.

18. The new crystalline tetraacetylated colchicum glucoside tetraaceto colchiocoside of the general formula $C_{35}H_{41}O_{15}N$, crystallizing in rectangular crystals, melting at about 175–177° C. (in the block) and being levorotatory with a rotatory power in 1% solution in chloroform $|\alpha|_D^{15}:-57°\pm3°$, being readily soluble in water and halogenated lower aliphatic hydrocarbons, and insoluble in ether, its acetyl value being about 30%, said colchicoside tetraacetate containing one tetraacetyl glucosidyl residue per mol glucoside, having physiological properties corresponding to those of colchicine and, on injection into the mouse, being at least 10 times less toxic than colchicine.

19. A composition for therapeutical, agricultural, and industrial use, comprising not less than 0.1 per cent of a colchicum glucoside compound selected from the group consisting of colchicoside and its tetraacylated derivatives, and a significant amount of a carrier substance compatible with said colchicum glucoside compound.

20. A composition for therapeutical, agricultural, and industrial use, comprising not less than 0.1 per cent of a colchicum glucoside compound selected from the group consisting of colchicoside and its tetraacylated derivatives, and a significant amount of a water diluent.

References Cited in the file of this patent

Mascre et al.: Chemical Abstracts, 46, 7621*d* (1952); Bellet, Chemical Abstracts, 46, 7711*c* (1952). (Copy in Library.) Pages 5 and 6.

Dyer: An Index of Tumor Chemotherapy, Federal Security Agency, Public Health Service, March 1949, pages 104 to 106. (Copy in Division 43.)